United States Patent [19]
Jones

[11] 3,718,332
[45] Feb. 27, 1973

[54] OCCUPANT RESTRAINT SYSTEM

[75] Inventor: Trevor O. Jones, Birmingham, Mich.

[73] Assignee: General Motors Corporation, Detroit, Mich.

[22] Filed: Aug. 27, 1971

[21] Appl. No.: 175,576

[52] U.S. Cl. ............... 280/150 AB, 180/82, 180/91, 180/103, 293/4, 293/70, 340/61
[51] Int. Cl. .............................................. B60r 21/08
[58] Field of Search ....280/150 AB; 180/103, 82, 91; 293/2, 4; 340/61

[56] References Cited

UNITED STATES PATENTS

| | | | |
|---|---|---|---|
| 3,638,964 | 2/1972 | Chute | 280/150 AB |
| 3,582,107 | 6/1971 | Goetz et al. | 280/150 AB |
| 3,663,035 | 5/1972 | Norton | 102/39 X |
| 3,684,309 | 8/1972 | Uchiyamada | 280/150 AB |
| 3,495,675 | 2/1970 | Hass et al. | 280/150 AB X |
| 3,420,572 | 1/1969 | Bisland | 280/150 AB X |

*Primary Examiner*—Leo Friaglia
*Assistant Examiner*—John P. Silverstrim
*Attorney*—W. E. Finken et al.

[57] ABSTRACT

An inflatable occupant restraint cushion is inflated at predetermined levels in accordance with predetermined levels of intensity of impact forces applied to the vehicle. When the impact forces are at a low level, above a predetermined minimum and below a predetermined maximum, a low level system initiates low level inflation of the cushion at a predetermined rate greater than normal. When the impact forces exceed the predetermined maximum, a high level system initiates high level inflation of the cushion at the predetermined normal rate. The low level system includes an anticipatory sensor, such as a transducer actuated by the relative rate of movement of telescopic members of an energy absorbing bumper system, and a low level inertial sensor, mounted on the telescopic members or on the vehicle body, and connecting low level detonators across a source of power when the impact forces exceed the capability of the energy absorbing bumper system and there is the likelihood of the onset of vehicle deformation. The high level system includes the low level inertial sensor, and a high level inertial sensor, actuated by vehicle deformation resulting from impact forces exceeding the predetermined maximum, and connecting high level detonators across a source of power. The low level and high level detonators control selective actuation of flow control orifices to obtain the predetermined rates of inflation.

8 Claims, 1 Drawing Figure

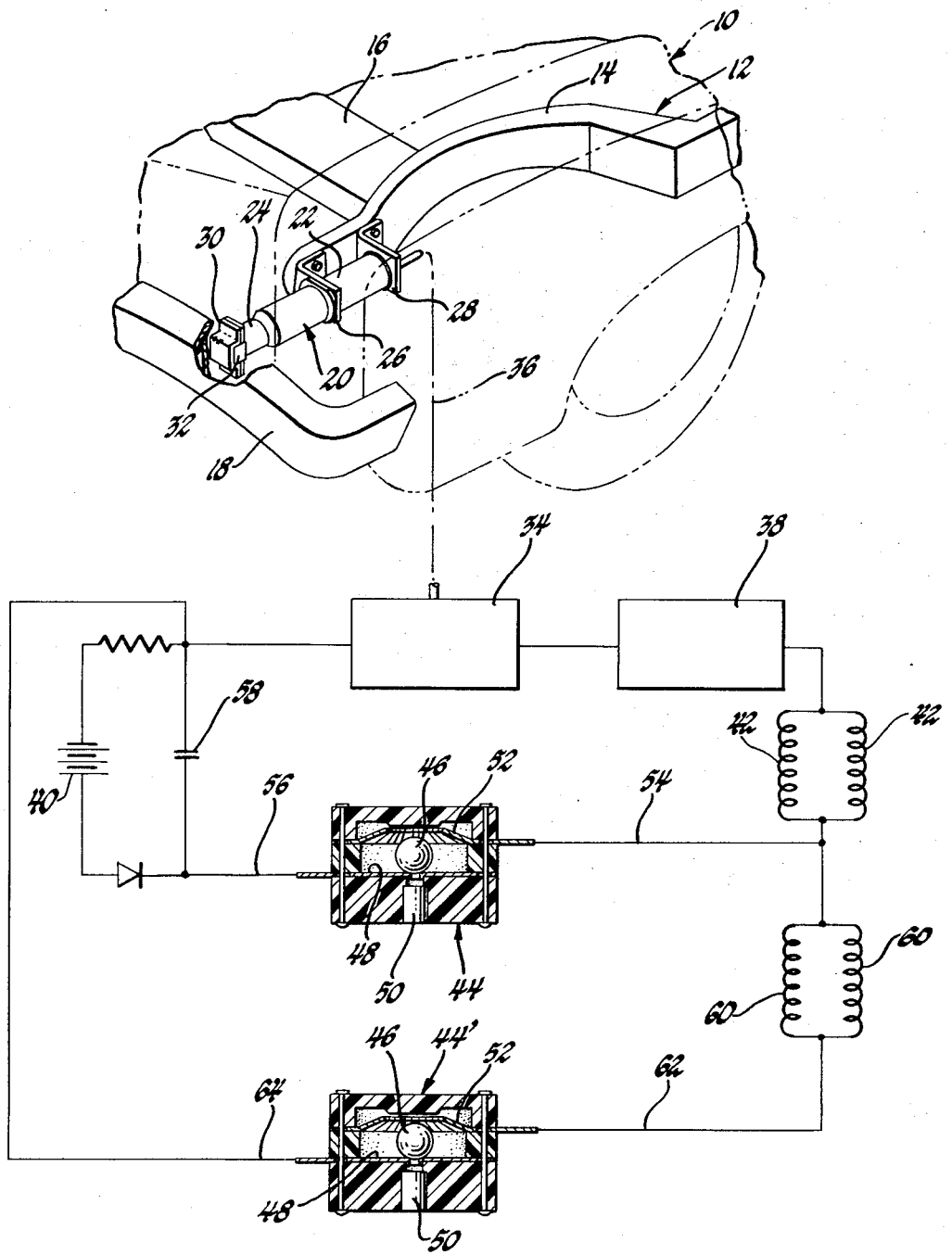

OCCUPANT RESTRAINT SYSTEM

This invention relates to inflatable occupant restraint systems and more particularly to multiple level inflatable occupant restraint systems.

Conventionally, inflatable occupant restraint systems include various sensors, such as inertial sensors actuated by vehicle deformation, bumper impact switches, manual switches, and other sensors and switches, or combinations of these, for initiating inflation of the occupant restraint cushion when actuated. Only one level of inflation or one time period of inflation is provided.

The system of this invention includes low and high level control systems for initiating inflation of the cushion at predetermined rates in accordance with predetermined levels of intensity of impact forces. The low level system is responsive to low level impact forces exceeding a predetermined minimum level and below a predetermined higher level to initiate low level inflation of the cushion or inflation at a predetermined rate less than normal. The high level system is responsive to impact forces exceeding the predetermined higher level to initiate high level inflation of the cushion or inflation at the predetermined normal rate.

The low level control system includes an anticipatory sensor and a low level inertial sensor which initiate inflation of the cushion at a predetermined rate greater than the normal rate when actuated. The anticipatory sensor is actuated by the energy absorbing bumper system of the vehicle when the sensor senses that the impact forces applied to the bumper system will exceed the energy absorbing capability thereof and there is the likelihood of vehicle deformation. The low level inertial sensor is set at a low level so as to be actuated by impact forces prior to the onset of vehicle deformation. The low level system ensures that inflation of the cushion is initiated prior to the onset of vehicle deformation should the impact forces exceed the absorption capability of the bumper system. Other anticipatory sensors which do not require application of impact forces to the vehicle, such as radar or laser units may be used in place of the sensor actuated by the bumper system so that the zone of response of the low level system need not be limited to impact forces applied to the impact bar of the bumper system. The anticipatory sensor ensures that initiation of inflation of the cushion by the low level sensor can occur only by the application of impact forces to the bumper system or body.

The high level control system includes the low level inertial sensor and a high level inertial sensor and initiates inflation of the cushion after the onset of vehicle deformation. The zone of response of the high level system is limited only by the directional sensitivity of the sensors thereof. The pulse levels of amplitude and time required to actuate the high level sensor are higher than the pulse levels required to actuate the low level sensor so that initiation of inflation of the cushion at the normal or high level rate can occur only when the high level sensor is actuated.

Copending application Ser. No. 124,282 Raymond G. Fischer et al., filed Mar. 15, 1971, and assigned to the assignee of this invention, discloses an occupant restraint system wherein inflation of a cushion is initiated by an energy absorbing bumper system when the impact forces applied to the system exceed the telescopic absorption capability thereof. The bumper system includes pairs of telescopic members supporting the impact bar on the vehicle and including variable volume chambers. The energy absorption occurs through the displacement of a medium from one chamber to the other through a variable area orifice in a piston movable in a direction to decrease the volume of the one chamber. A pressure transducer is responsive to a pressurization of the one chamber indicative of the impact forces exceeding the energy absorbing capability of the system to connect electrically fired detonators with a source of power and initiate rupture of a diaphragm sealing a pressure vessel so that pressure fluid may flow from the vessel through a manifold and diffuser to inflate an occupant restraint cushion.

The restraint system of this invention uses a substantially similar system in combination with a low level inertial type sensor to provide the low level control system. The low level sensor is mounted on the telescopic members or on the body and is actuated at approximately the same time as the transducer by an acceleration pulse of predetermined amplitude and time generated by the impact forces applied to the bumper system or to the body by the telescopic members. The high level control system is provided by the low level sensor and a high level sensor of the same structure but set so as to be responsive to higher level acceleration pulses of predetermined amplitude and time applied to the body.

Copending application Ser. No. 175,661, Thomas H. Vos, filed Aug. 27, 1971 and assigned to the assignee of this invention, discloses an occupant restraint system wherein the opening of a pressure vessel is closed by a first plug having a bore of predetermined diameter opening at one end to the vessel and at the other end to a passage communicating with the cushion. A second plug is connected to the first plug at the one end of the bore by a rupturable flange to close the bore to the vessel. The second plug includes a bore of smaller diameter opening to the passage and vessel and closed by a rupturable diaphragm. Respective detonators are provided to rupture the flange and the diaphragm. When the diaphragm is ruptured, the contents of the pressure vessel flow through the smaller diameter bore of the second plug to the cushion so that the rate of inflation of the cushion is less than normal. When the flange is ruptured, the contents of the pressure vessel flow through the larger diameter bore of the first plug so that the cushion is inflated at the normal rate.

Copending application Ser. No. 175,577, Houston F. Blanchard, filed Aug. 27, 1971, and assigned to the assignee of this invention, discloses an occupant restraint system wherein a pressure vessel is provided with adjacent inlet orifices, one of larger predetermined area than the other, with both being sealed by diaphragms rupturable by respective detonators. Both orifices are serially connected with an outlet orifice of predetermined area greater than that of the other inlet orifice and less than that of the one inlet orifice. Upon rupture of the diaphragm sealing the other inlet orifice, the inlet orifice controls the rate of flow of pressure fluid from the vessel and the pressure fluid flows at a rate less than maximum through the outlet orifice to the cushion so that the rate of inflation of the cushion is less than normal. When the diaphragm sealing the one inlet orifice is additionally ruptured, the rate of flow of pressure fluid to the cushion is controlled by the outlet orifice so that the rate of inflation of the cushion is the normal rate.

Either of the aforenoted Vos and Blanchard occupant restraint systems may be used in conjunction with the high level and low level control systems of this invention in order to provide the predetermined high level and low level rates of inflation of the cushion. If the former system is used, the detonators for rupturing the diaphragm of the second plug would be fired by the low level control system and the detonators for rupturing the flange of the first plug would be fired by the high level control system. If the latter system were used, the smaller area orifice diaphragm would be ruptured by the low level control system and the larger area orifice diaphragm would be ruptured by the high level system. Alternatively, other suitable flow control orifice arrangements may be used, such as solenoid controlled valves respective to and operated by the high level and low level control systems or otherwise.

The multiple level system of this invention thus initiates inflation of an occupant restraint cushion at predetermined rates in accordance with predetermined levels of intensity of impact force. This primary feature of the invention and other features will be readily apparent from the following specification and drawings wherein:

The drawing is a schematic of any occupant restraint system according to this invention.

Referring now to the drawing, a vehicle body schematically indicated at 10 and being of either the body-frame type or the integral body type includes a frame or frame extension 12 having a pair of forward frame rails 14, only the left-hand rail being shown and it being understood that the right-hand rail is of like but opposite hand construction. The frame rails are of conventional structure and are interconnected adjacent their free forward ends by a front frame cross member 16. A bumper or impact bar 18 extends across the front of the vehicle 10 and is supported thereon by a pair of like energy absorbing struts or devices 20, only the left-hand strut being shown and it being understood that the right-hand strut is of the same construction.

The strut 20 is disclosed in detail in copending application Ser. No. 124,282, Fischer et al., filed Mar. 15, 1971, and assigned to the assignee of this invention. Reference may be had to such application for the details, and only a description necessary to an understanding of this invention will be set forth herein. Generally the strut 20 includes an outer cylindrical member 22 and an inner cylindrical member 24 which are telescopically arranged. The member 22 is supported on the rail 14 by an angle bracket 26 welded thereto and bolted to the rail, and an angle bracket 28 which is secured to the closed rear wall thereof and likewise bolted to the rail 14. The member 24 is secured to the bumper 18 by a bracket assembly 30 which includes an intervening resilient member 32. Generally, the rearward end of the member 24 is closed by a centrally apertured piston which receives a metering rod fixedly secured to the rear wall of the member 22 to provide a variable orifice through the piston. The piston cooperates with the member 22 to provide a first variable volume chamber therein. The piston further cooperates with a gas pressure located second piston within the member 24 to provide a second variable volume chamber therein. Both chambers are filled with a displaceable medium, such as oil. The pressure of the gas within the member 24 reacting against the second piston normally locates the bumper 18 in an extended position as shown.

When impact forces above a predetermined lower limit are applied to the bumper 18, the member 24 and the first piston move as a unit inwardly of the member 22. The flow of oil from the first chamber to the second through the variable area orifice absorbs the energy of the impact forces applied to the bumper 18 as the member 24 and the first piston move inwardly. The area of the orifice in the piston is arranged so as to decrease upon inward movement of the member 24 so that there is an increasing fluid resistance to such movement and an increasing pressurization of the first variable volume chamber within the member 22. If the impact forces applied to the bumper 18 exceed those which can be absorbed by the strut 20, the pressure within the first chamber will rise instantaneously above a level which can be contained by the strut 20 and there will then be a loss of structural integrity of the strut and, of course, resultant deformation of the vehicle 10.

The pressure within the first chamber is applied to a conventional pressure operated piezoelectric transducer 34 through a passage 36 which communicates the transducer with the first chamber. A specific example of a suitable transducer would be a Kistler Model 607A. The transducer 34 is connected in series with an amplifier 38, the vehicle battery 40, a pair of detonators 42 and a sensor 44 to provide the low level system.

The transducer 34 is set so as to be actuated from passage 36 only when a certain pressure level occurs within the first chamber. This level of actuation is below the level at which the strut 20 loses structural integrity and is indicative of the rate of movement of member 24 relative to member 22, which, in turn, is indicative of whether the strut 20 is operating within its energy absorption limit. The sensor 44 is the same as that disclosed in detail in Ser. No. 35,674 Gillund, filed May 8, 1970 now U.S. Pat. No. 3,619,524, issued Nov. 9, 1971 and assigned to the assignee of this invention. Generally the sensor 44 includes a ball 46 seating within an opening in a circular contact plate 48 under the influence of a permanent pole type magnet 50. A second circular contact plate 52 having a plurality of circularly arranged integral spring fingers is located is spaced relationship to the plate 48. When the ball 46 is subjected to an acceleration pulse of predetermined amplitude and time, the ball moves radially of the plate 48. The engagement of the ball with one or more of the spring fingers of plate 52 completes the circuit between the plates of the sensor. The plates 48 and 52 are supported within a plastic casing and each includes an integral extension providing for electrical connection of the plate 52 with the detonators 42 by conductor 54, and electrical connection of the plate 48 by conductor 56 with a capacitor 58 and the battery 40. The capacitor 58 is normally charged to battery potential and provides for firing of the detonators 42 should the sensor 44 and transducer 34 be actuated and the battery 40 unable to supply the necessary potential.

The sensor 44 is mounted on the strut 20 or at a suitable location on the body 10 for receipt of acceleration pulses applied to the strut or to the body through the strut 20. When an acceleration pulse or predetermined amplitude and time is generated by impact forces applied to the bumper 18 and transmitted to the strut 20 or to the body by strut 20, the sensor 44 will be actuated. The level of actuation of the sensor is set approximately the same as that of the transducer 34. Thus, when the transducer 34 and sensor 44 are actuated, they fire the detonators 42 to initiate low level inflation of the inflatable cushion prior to the onset of any vehicle deformation.

The detonators 42 rupture the diaphragm of the smaller diameter bore of the aforenoted Vos system so that the contents of the pressure vessel will flow to the cushion at a rate less than normal and consequently the rate of inflation of the cushion will be less than the normal rate. This permits low level inflation of the cushion. Alternatively, the detonators 42 will rupture the smaller predetermined area inlet orifice of the aforenoted Blanchard system so that the rate of inflation of the cushion will likewise be less than normal.

The transducer 34 functions as an anticipatory sensor since it detects levels of intensity of impact forces which are likely to result in vehicle deformation. In place of the transducer and amplifier 38, other anticipatory sensors may be used such as a conventional radar unit, a conventional laser unit, or combinations of such units. In a low level system using radar or laser units, both such units and the sensor 44 must be actuated before inflation of the cushion can occur. Actuation of one alone cannot command inflation of the cushion. In the specific embodiment disclosed, the transducer 34 and sensor 44 must both be actuated to initiate inflation of the cushion. Actuation of one alone cannot result in inflation of the cushion. Regardless of the anticipatory sensor which is used, impact of the vehicle with an object resulting in a level of intensity of impact above a predetermined minimum and below a predetermined maximum must occur before the low level system is actuated.

The energy absorbing bumper system is capable of absorbing only low speed impacts, such as impacts at speeds up to 10 miles per hour. Above such speed, the impact forces applied to the bumper 18 exceed the energy absorbing capability of the struts 20 and deformation will occur. Additionally, the bumper 18 protects only a portion of a limited area of the vehicle, such as the front end thereof. It is also possible for impact forces to be applied to such area and not be applied to the bumper 18. Accordingly, the restraint system of this invention includes an additional high level control system which is responsive only to vehicle deformation.

The high level system includes the sensor 44 and a like sensor 44' connected in series with each other and with detonators 60, battery 40, and capacitor 58 by conductors 54, 56, 62, and 64. The sensor 44' is structurally the same as the sensor 44, like numerals being used for like parts, but requires a higher level predetermined pulse for actuation thereof. The pulse level required to actuate the sensor 44' is set so as to require higher impact forces than those required to actuate the sensor 44 and transducer 34. The detonators 60 rupture the flange of the aforenoted Vos system so that the contents of the pressure vessel will flow to the cushion at the normal rate and the cushion will be inflated during the normal time period. Alternatively, the detonators 60 will rupture the larger predetermined area orifice of the aforenoted Blanchard system so that the rate of inflation of the cushion will be the normal rate. As noted before in conjunction with detonators 42, such detonators may be dispensed with and in place of the aforenoted Vos and Blanchard systems, solenoid controlled valves may be used. Further, the detonators and likewise the valves can be actuated in series with a predetermined time interval if so desired.

The zone of response of the sensors 44 and 44' is at least generally coextensive with the zone of response of the bumper 18. It is believed apparent that the sensor 44' may be actuated without any actuation of the sensor 44 if the pulse level is above that required to actuate the former but below that required to actuate the latter. If such pulse level results from impact forces applied directly to the vehicle body, the cushion will not be inflated. However, if the pulse level reaches the higher level required to actuate sensor 44', then the cushion will be inflated.

Although the sensors 44 and 44' are shown as being of the omnidirectional type in that they are responsive to acceleration pulses regardless of their direction in a horizontal plane, it is believed apparent that the sensors may be of the limited directional type or of the axial type. The zone of response of the sensors 44 and 44' includes the area of the vehicle protected by the bumper 18. However, the amplitude and time of the actuating pulse for the sensor 44' requires higher impact forces than those required to actuate the transducer 34 and sensor 44. This provides a multiple level restraint system in that lower level impact forces applied to the bumper 18 which exceed the energy absorbing capability of the struts trigger or actuate the transducer 34 and sensor 44 to inflate the cushion prior to the onset of vehicle deformation, and higher level impact forces actuate the sensors 44 and 44' to inflate the cushion.

Although not shown, it is believed apparent that additional transducers can be included in the other struts of the energy absorbing bumper system.

Thus, this invention provides an improved occupant restraint system.

I claim:

1. The combination comprising, an automotive vehicle subject to low level impacts below a predetermined limit of intensity and high level impacts equal to or exceeding such predetermined limit of intensity, a source of pressure fluid, an occupant restraint cushion inflatable from the source for engagement by vehicle occupants upon the occurrence of said low level and high level impacts, first inflating means operable to inflate the cushion at a relatively slow rate, second inflating means operable to inflate the cushion at a relatively rapid rate, first sensor means operable to sense the likelihood of the vehicle being subjected to said low level impacts for actuating the first inflating means to inflate the cushion at the relatively slow rate, and second sensor means operable to sense high level impacts to which the vehicle is subjected for actuating the second inflating means to inflate the cushion at the relatively rapid rate.

2. The combination comprising an automotive vehicle having a source of pressure fluid and an inflatable cushion, first means for inflating the cushion from the source at a first relatively slow rate, second means for inflating the cushion from the source at a second relatively rapid rate, an energy absorbing bumper system including an impact bar and means for absorbing the energy of impact forces applied to the impact bar below a predetermined upper limit of absorption delineating the onset of vehicle deformation, first control means responsive to lower level impact forces applied to the impact bar and exceeding the predetermined upper limit for actuating said first inflating means prior to the onset of vehicle deformation to inflate the inflatable cushion from the pressure fluid source at the first rate, and second control means responsive to higher level impact forces and the resultant vehicle deformation for actuating said second inflating means to inflate the inflatable cushion from the pressure fluid source at the second rate.

3. The combination comprising, an automotive vehicle having a source of pressure fluid and an inflatable cushion, first means for inflating the cushion from the source at a first relatively slow rate, second means for inflating the cushion from the source at a second relatively rapid rate, first control means responsive to the application of impact forces to the vehicle exceeding a predetermined limit delineating the onset of vehicle deformation for actuating said first inflating means to initiate inflation of the inflatable cushion from the pressure fluid source at the first rate prior to the onset of vehicle deformation, and second control means responsive to the application of impact forces to the vehicle exceeding a predetermined higher limit and resultant vehicle deformation for actuating said second inflating means to initiate inflation of the inflatable cushion from the pressure fluid source at the second predetermined rate.

4. The combination comprising, an automotive vehicle having a source of pressure fluid and an inflatable cushion, first means for inflating the cushion from the source at a first predetermined lower rate, second means for inflating the cushion from the source at a second predetermined higher rate, first control means responsive to the likelihood of vehicle deformation from impact forces applied thereto for actuating said first inflating means to initiate inflation of the inflatable cushion from the pressure fluid source prior to the onset of vehicle deformation, and second control means responsive to subsequent vehicle deformation resulting from impact forces applied thereto for actuating said second inflating means to initiate inflation of the inflatable cushion from the pressure fluid source at the second predetermined higher rate.

5. The combination comprising, an automotive vehicle having a source of pressure fluid and an inflatable cushion, first means for inflating the cushion from the source at a first predetermined lower rate, second means for inflating the cushion from the source at a second predetermined higher rate, an energy absorbing bumper system capable of absorbing impact forces below a predetermined upper limit of intensity, first control means responsive to the likelihood of the upper limit of intensity being exceeded for actuating said first inflating means to inflate the inflatable cushion from the pressure fluid source at the lower rate, and second control means responsive to a second predetermined upper limit of intensity of impact forces being exceeded for actuating said second inflating means to inflate the inflatable cushion from the pressure fluid source at the higher rate.

6. The combination comprising, an automotive vehicle having a source of pressure fluid and an inflatable cushion, first means for inflating the cushion from the source at a first lower rate, second means for inflating the cushion from the source at a second higher rate, first control means for actuating said first inflating means to inflate the inflatable cushion from the pressure fluid source at the lower rate prior to the onset of vehicle deformation, and second control means for actuating said second inflating means to inflate the inflatable cushion from the pressure fluid source at the higher rate, the first control means including anticipatory sensor means responsive to a predetermined probability of vehicle deformation from impact forces and inertial sensor means responsive to a predetermined level acceleration pulse generated by impact forces, the second control means including the first inertial sensor means and second inertial sensor means responsive to a predetermined higher level acceleration pulse generated by vehicle deformation resulting from impact forces.

7. The combination comprising, an automotive vehicle having a source of pressure fluid and an inflatable cushion, first means for inflating the cushion from the source at a first lower rate, second means for inflating the cushion from the source at a second higher rate, first control means for actuating said first inflating means to inflate the inflatable cushion from the pressure fluid source at the lower rate prior to the onset of vehicle deformation, and second control means for actuating said second inflating means to inflate the inflatable cushion from the pressure fluid source at the higher rate, the first control means including anticipatory first sensor means actuated in response to a predetermined probability of vehicle deformation from impact forces and second sensor means actuated by predetermined lower level acceleration pulses generated by such impact forces, the second control means including said second sensor means and third sensor means actuated by predetermined higher level acceleration pulses generated by such impact forces.

8. The combination comprising, an automotive vehicle including a source of pressure fluid and an inflatable occupant restraint cushion, control means operative at predetermined low levels and high levels of intensity of vehicle impact, first means operable to set the rate of flow of pressure fluid from the source to the cushion at a first lower value, second means operable to set the rate of flow of pressure fluid from the source to the cushion at a second higher value, and means interconnecting the control means and said first and second rate setting means for operating said first rate setting means in accordance with operation of the control means at a low level of impact and operating said second rate setting means in accordance with operation of the control means at a high level of impact.

* * * * *